United States Patent
Arrigoni et al.

(10) Patent No.: US 11,613,608 B2
(45) Date of Patent: Mar. 28, 2023

(54) THERMOPLASTIC COMPOSITION

(71) Applicant: MULTIBASE S.A., Saint Laurent du Pont (FR)

(72) Inventors: Aurelie Arrigoni, Saint Laurent du Pont (FR); Sylvain Boucard, Pont de Beauvoisin (FR)

(73) Assignee: MULTIBASE SA, Saint Laurent du Pont (FR)

( * ) Notice: Subject to any disclaimer, the term of this patent is extended or adjusted under 35 U.S.C. 154(b) by 0 days.

(21) Appl. No.: 16/478,162

(22) PCT Filed: Jan. 30, 2018

(86) PCT No.: PCT/EP2018/052287
§ 371 (c)(1),
(2) Date: Jul. 16, 2019

(87) PCT Pub. No.: WO2018/141750
PCT Pub. Date: Aug. 9, 2018

(65) Prior Publication Data
US 2019/0367671 A1    Dec. 5, 2019

(30) Foreign Application Priority Data

Jan. 31, 2017 (EP) .................................. 17305112

(51) Int. Cl.
| | | |
|---|---|---|
| *C08G 77/12* | (2006.01) | |
| *C08L 83/04* | (2006.01) | |
| *C08G 69/40* | (2006.01) | |
| *C08K 3/36* | (2006.01) | |

(52) U.S. Cl.
CPC ............. *C08G 69/40* (2013.01); *C08G 77/12* (2013.01); *C08K 3/36* (2013.01); *C08L 83/04* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 5,726,256 A * | 3/1998 | Benson | C08G 77/44 525/477 |
| 6,013,715 A | 1/2000 | Gornowicz et al. | |
| 6,281,286 B1 * | 8/2001 | Chorvath | C08L 67/02 524/791 |
| 6,362,288 B1 * | 3/2002 | Brewer | C08L 77/00 524/730 |
| 6,569,955 B1 * | 5/2003 | Brewer | C08G 77/455 524/751 |
| 8,349,640 B2 | 1/2013 | Paul | |
| 9,068,102 B2 | 6/2015 | Nagato et al. | |
| 10,246,580 B2 | 4/2019 | Arrigoni et al. | |
| 2002/0091205 A1 * | 7/2002 | Brewer | C08L 77/00 525/431 |
| 2005/0205829 A1 | 9/2005 | Magd et al. | |

FOREIGN PATENT DOCUMENTS

| | | |
|---|---|---|
| EP | 0838512 | 4/1998 |
| WO | 2003035759 | 5/2003 |
| WO | 2010072812 | 7/2010 |

* cited by examiner

*Primary Examiner* — Ana L. Woodward
(74) *Attorney, Agent, or Firm* — Matthew T. Fewkes

(57) ABSTRACT

A thermoplastic elastomer composition comprising a blend of (A) thermoplastic materials comprising (A1) a polyamide block copolymer and (A2) one or more thermoplastic organic polymers excluding (A1), with (B) a silicone composition comprising (B1) a silicone base comprising (B1a) a diorganopolysiloxane polymer having a viscosity of at least 1000000 mPa·s at 25° C. and an average of at least 2 alkenyl groups per molecule, (B1b) a reinforcing filler in an amount of from 1 to 50% by weight of polymer (B1a), and (B2) an organohydrido silicone compound which contains an average of at least 2 silicon-bonded hydrogen groups per molecule, (C) a hydrosilylation catalyst, which composition may additionally optionally comprise (D) one or more additives; wherein the weight ratio (A):(B) is in the range 50:50 to 95:5, and wherein component B2 and C being present in an amount sufficient to cure said silicone composition B.

14 Claims, No Drawings

THERMOPLASTIC COMPOSITION

CROSS REFERENCE TO RELATED APPLICATIONS

This application is a U.S. national stage filing under 35 U.S.C. § 371 of PCT Application No. PCT/EP18/052287 filed on Jan. 30, 2018, currently pending, which claims the benefit of EP Patent Application No. 17305112.9 filed Jan. 31, 2017 under 35 U.S.C. § 119 (e). PCT Application No. PCT/EP18/052287, EP Patent Application No. 17305112.9 are hereby incorporated by reference.

This invention relates to thermoplastic elastomers (TPEs) especially engineering polymers of high added value used in various sectors, such as electronics, automobiles or sports, as well as thermoplastic elastomer compositions from which they are manufactured and also to a process for forming a vulcanised thermoplastic elastomer composition.

Thermoplastic elastomers (TPEs) are polymeric materials which possess both plastic and rubbery properties. Whilst TPEs have elastomeric mechanical properties, unlike conventional thermoset rubbers, they can be re-processed at elevated temperatures. This re-process ability is a major advantage of TPEs over chemically crosslinked rubbers since it allows recycling of fabricated parts and results in a considerable reduction of scrap.

In general, two main types of thermoplastic elastomers are known, block copolymer TPEs and simple blend TPEs (physical blends).

Block copolymer TPEs contain
(i) blocks or segments that are called hard or rigid (i.e. having a thermoplastic behaviour), typically these have a melting point or glass transition temperature above ambient temperature; and
(ii) blocks or segments that are called soft which are pliable or flexible (i.e. having an elastomeric behaviour). which typically have a low glass transition temperature (Tg) or a melting point considerably below room temperature.

The expression "low glass transition temperature" is understood to mean a glass transition temperature Tg below 15° C., preferably below 0° C., advantageously below −15° C., more advantageously below −30° C., possibly below −50° C.

In Block copolymer thermoplastic elastomers the hard segments aggregate to form distinct micro phases and act as physical crosslinks for the soft phase, thereby imparting a rubbery character at room temperature. At elevated temperatures, the hard segments melt or soften and allow the copolymer to flow and to be processed. The hard blocks are generally based on polyamides, polyurethanes, polyesters or a mixture of thereof. The soft blocks are generally based on polyethers (PE), polyester and copolymers or blends thereof. Examples of copolymers with hard blocks and soft blocks include, copolymers with polyester blocks and polyether blocks (copolyetheresters which are often abbreviated to COPE);
copolymers with polyurethane blocks and polyether blocks (thermoplastic polyurethanes, often abbreviated to TPU) and
copolymers with polyamide blocks and polyether blocks (Polyether-Block-Amides often abbreviated to PEBA.).

PEBAs are generally plasticizer-free thermoplastic elastomers which are considered as engineering polymers. They make it possible to combine, in a single polymer, unequalled mechanical properties and very good resistance to thermal or UV aging, as well as low density. They thus make it possible to produce lightweight components. In particular, at equivalent hardness, they dissipate less energy than other materials, which provides them with very good resistance to dynamic stresses in bending or tension, and they have exceptional properties of elastic springback. However, it is very difficult to generate soft PEBA type materials which have low shore A hardness, i.e. <100 without losing many of the benefits described above. Typically PEBAs are approximately 1:1 combinations of hard blocks and soft blocks and any significant increase in the proportion of soft blocks can cause manufacturing issues.

TPEs referred to as simple blends or physical blends can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanize or TPSiV).

U.S. Pat. No. 6,281,286 describes a high impact strength composition made from polyamide homopolymer and silicone gum.

U.S. Pat. No. 6,362,288 describes a method to obtain a thermoplastic silicone elastomer from compatibilized polyamide resin, silicone gum, filler and compatibilizer (coupling agent, organofunctional diorganopolysilane or a siloxane copolymer).

The present invention is seeking to obtain a thermoplastic comprising a PEBA in thermoplastic phase having low hardness, i.e. a Shore A hardness value below 90, alternatively a Shore A hardness value of below 85, and as a further alternative a Shore A hardness value of below 80. In each of the above said hardness values are obtained in the absence of a plasticizer and/or compatibilizer.

There is provided herein a thermoplastic elastomer composition comprising a blend of
(A) thermoplastic materials comprising:
  (A1) a thermoplastic organic polyether block amide copolymer and
  (A2) one or more thermoplastic organic polymers excluding (A1), with
(B) a silicone composition comprising:
  (B1) a silicone base comprising:
    (B1a) a diorganopolysiloxane polymer having a viscosity of at least 1000000 mPa·s at 25° C. and an average of at least 2 alkenyl groups per molecule,
    (B1b) a reinforcing filler in an amount of from 1 to 50% by weight of polymer (B1a), and
  (B2) an organohydrido silicone compound which contains an average of at least 2 silicon-bonded hydrogen groups per molecule,
(C) a hydrosilylation catalyst,
  which composition may additionally optionally comprise
  (D) one or more additives; wherein the weight ratio (A):(B) is in the range 50:50 to 95:5, and wherein component B2 and C being present in an amount sufficient to cure said silicone composition B.

It has been identified that the cured product resulting from curing the above provides a material having low hardness, i.e. a Shore A hardness value below 90, alternatively a Shore A hardness value of below 85, and as a further alternative a Shore A hardness value of below 80. Furthermore as can be seen from the above composition these values may be obtained in the absence of a plasticizer and/or compatibilizer.

One advantage of the present invention is to obtain such low hardness by using hard (A1) and (A2) as the thermoplastic materials (A) thereby limiting soft block content, and thereby maintaining the physical property benefits expected from having a high hard block content such as thermal and chemical resistance whilst the resulting product is has a relatively low Shore A hardness due to the presence of the silicone composition (B).

It was observed that the product of the above composition according to the invention surprisingly substantially maintains the impact or shock resistance of component (A) which would have been expected in the absence of component (B).

Advantageously, use of plasticisers and/or compatibilizers is not needed to achieve thermoplastic based silicone block copolymer amide elastomer of the present invention.

For the avoidance of doubt, silanes and siloxanes are compounds containing silicon.

A silane is a compound derived from $SiH_4$. A silane often contains at least one Si—C bond. A silane usually contains only one Si atom.

A siloxane is a compound which contains at least one Si—O bond.

A polysiloxane contains several Si—O—Si— bonds forming a polymeric chain, where the repeating unit is —(Si—O)—. An organopolysiloxane is sometimes called a silicone. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is not at the end of the polymeric chain.

A polymer is a compound containing repeating units which units typically form at least one polymeric chain. A polymer can be a homopolymer or a copolymer. A homopolymer is a polymer which is formed from only one type of monomer. A copolymer is a polymer formed from at least two different monomers. A polymer is called an organic polymer when the repeating units contain carbon atoms.

Some polymers are thermoset: once cooled and hardened, these polymers retain their shapes and cannot return to their original form. Other polymers are thermoplastics: they can soften upon heating and return to their original form.

A cross linking reaction is a reaction where two or more molecules, at least one of them being a polymer, are joined together to harden or cure the polymer. A cross linker is a compound able to produce a crosslinking reaction of a polymer.

The viscosity values of high viscosity diorganopolysiloxane polymers (e.g. ≥1000000 MPa·s) as required in (B1a) may be measured by using an AR 2000 Rheometer from TA Instruments of New Castle, Del., USA or a suitable Brookfield viscometer with the most appropriate spindle for the viscosity being measured. However, (B1a) may be a silicone gum which is a polymer of high molecular weight with a very high viscosity. A gum will typically have a viscosity of at least 2000 000 mPas at 25° C. but generally has a significantly greater viscosity. Hence, gums are often characterised by their Williams plasticity value in accordance with ASTM D-926-08 given the viscosity becomes very difficult to measure.

There is also provided herein a process for forming a vulcanised thermoplastic elastomer from the composition above comprising contacting thermoplastic materials (A) with silicone composition (B).

The weight ratio of (A) to (B) is in the range 50:50 to 95:5.

Additional component (D) could be added in composition to further manage invention properties according specifics needs of end application.

Thermoplastic Materials (A)

Thermoplastic materials (A) may comprise
from 10-90% by weight of (A1) as described herein and
90-10% by weight of (A2),
Polyamide block copolymer (A1)

Polyamide block copolymer (A1) is based on hard blocks which may be based on polyamide or a blend of polyamide and polyester polymers. These blocks are in particular described in US 2011/0183099. The hard blocks are preferably based on polyamide. The polyamide (abbreviated to PA) blocks may comprise homopolyamides or copolyamides.

The polyamide blocks that can be envisaged in the composition of the invention are a block copolymer comprising at least one rigid polyamide (homopolyamide or copolyamide) block and at least one flexible block, Copolymers with hard blocks and soft blocks may include,
  COPE;
  TPU and preferably
  thermoplastic organic polyether block amide copolymer (which may hereafter be referred to as PEBA).

In the PEBA the proportion by weight of said at least one rigid polyamide block represents from 5% to 95%, preferably from 15% to 95%, the proportion by weight of said at least one flexible block represents from 5% to 95%, preferably from 5% to 85%, relative to the total weight of copolymer.

Preferably, the number-average molar mass Mn of the polyamide blocks is included in the range of from 400 to 20 000 g/mol, preferably from 500 to 10 000 g/mol, more preferably from 500 to 3000 g/mol, even more preferably from 500 to 2000 g/mol based on polystyrene equivalents using the method described in ASTM D6474-12.

In the block copolymer the PA blocks may comprise carboxylic acid end groups, and the term diacid PA is then used, or else they may comprise an amine end group, and the term diamine PA is used. The bonds between the PA blocks and the soft blocks (SB) can therefore be ester bonds or else amide bonds. The polyamide blocks comprising dicarboxylic chain ends originate, for example, from the condensation of polyamide precursors in the presence of a chain-limiting dicarboxylic acid.

Three types of polyamides may be part of the composition of these PA blocks Products of the condensation of at least one (aliphatic, cycloaliphatic or aromatic) dicarboxylic acid, e.g. those having from 4 to 36 carbon atoms, alternatively from 6 to 18 carbon atoms, and one or more aliphatic, cycloaliphatic or aromatic diamine chosen in particular from those having from 2 to 36 carbon atoms, preferably those having from 6 to 12 carbon atoms Products of the condensation of one or more alpha, omega-aminocarboxylic acids and/or of one or more lactams having from 6 to 12 carbon atoms in the presence of a dicarboxylic acid having from 4 to 36 carbon atoms or of a diamine. Advantageously, the polyamide blocks of the second type are of polyamide 11, of polyamide 12 or of polyamide 6.

Polycondensation of at least one alpha, omega-aminocarboxylic acid (or one lactam) with at least one diamine and one dicarboxylic acid. In this case, the PA blocks are prepared by polycondensation: of the aliphatic, cycloaliphatic or aromatic diamine(s) having X carbon atoms; of the dicarboxylic acid(s) having Y carbon atoms; and of the comonomer(s) {Z}, chosen from lactams and alpha, omega-aminocarboxylic acids having Z carbon atoms; in the presence of a chain limiter chosen from dicarboxylic acids or diamines or of an excess of diacid or of diamine used as structural unit. Advantageously, the dicarboxylic acid having Y carbon atoms is used as chain limiter, said dicarboxylic acid being introduced in excess relative to the stoichiometry of the diamine(s).

Products of the condensation of at least two different alpha, omega-aminocarboxylic acids or of at least two different lactams having from 6 to 12 carbon atoms or of a lactam and of an aminocarboxylic acid not having the same number of carbon atoms, optionally in the presence of a chain limiter.

Examples of aliphatic diacids, include, for the sake of example, butanedioic acid, adipic acid, suberic acid, azelaic acid, sebacic acid, dodecanedicarboxylic acid, myristic acid, tetradecanedicarboxylic acid, hexadecanedicarboxylic acid, octadecanedicarboxylic acid and dimerized fatty acids. An Example of a cycloaliphatic diacid is 1,4-cyclohexyldicarboxylic acid. Examples of aromatic diacids, mention may be made of terephthalic (T), isophthalic acid (I) and the sodium, potassium or lithium salt of 5-sulfoisophthalic acid.

Examples of aliphatic diamines, include tetramethylenediamine, hexamethylenediamine, 1,10-decamethylenediamine, dodecamethylenediamine and trimethylhexamethylenediamine. Examples of cycloaliphatic diamines, include the isomers of bis(4-aminocyclohexyl)methane (BACM or PACM), bis(3-methyl-4-aminocyclohexyl)methane (BMACM or MACM), and 2,2-bis(3-methyl-4-aminocyclohexyl)propane (BMACP), isophoronediamine (IPDA), 2,6-bis(amino-methyl)norbornane (BAMN) and piperazine (Pip).

Examples of alpha, omega-aminocarboxylic acids, include aminocaproic acid, 7-aminoheptanoic acid, 11-aminoundecanoic acid and 12-aminododecanoic acid. Examples of lactams, include caprolactam, enantholactam and lauryllactam.

Products of (i) above may comprise at least one PA block based on PA 4.4, PA 4.6, PA 4.9, PA 4.10, PA 4.12, PA 4.13, PA 4.14, PA 4.16, PA 4.18, PA 4.36, PA 6.4, PA 6.6, PA 6.9, PA 6.10, PA 6.12, PA 6.13, PA 6.14, PA 6.16, PA 6.18, PA 6.36, PA 9.4, PA 9.6, PA 9.10, PA 9.12, PA 9.13, PA 9.14, PA 9.16, PA 9.18, PA 9.36, PA 10.4, PA 10.6, PA 10.9, PA 10.10, PA 10.12, PA 10.13, PA 10.14, PA 10.16, PA 10.18, PA 10.36, PA 10.T, PA 10.1, PA BMACM.4, PA BMACM.6, PA BMACM.9, PA BMACM.10, PA BMACM.12, PA BMACM.13, PA BMACM.14, PA BMACM.16, PA BMACM.18, PA BMACM.36, PA PACM.4, PA PACM.6, PA PACM.9, PA PACM.10, PA PACM.12, PA PACM.13, PA PACM.14, PA PACM.16, PA PACM.18, PA PACM.36, PA Pip.4, PA Pip.6, PA Pip.9, PA Pip.10, PA Pip.12, PA Pip.13, PA Pip.14, PA Pip.16, PA Pip.18 and/or PA Pip.36, and copolymers thereof.

Alternatively, the polyamide blocks, may be made from the following polyamides (copolyamides): PA 6/12 where 6 denotes caprolactam and 12 denotes lauryllactam; PA 11/12 where 11 denotes 11-aminoundecanoic acid and 12 denotes lauryllactam; PA 6/11 where 6 denotes caprolactam and 11 denotes 11-aminoundecanoic acid; PA 6/6.6 where 6 denotes caprolactam and 6.6 denotes a monomer resulting from the condensation of hexamethylenediamine with adipic acid. Examples, include PA 10.10/11, PA 6.10/11, PA 10.12/11, PA 10.10/11/12, PA 6.10/10.10/11, PA 6.10/6.12/11, PA 6.10/6.12/10.10, PA 11/6.36, PA 11/10.36 and PA 10.10/10.36.

As examples of polyamide blocks, mention may be made of those comprising at least one of the following molecules: PA-12, PA-11, PA-10,10, PA-6,10, PA-6, PA-6/12, a copolyamide comprising at least one of the following monomers: 11, 5,4, 5,9, 5,10, 5,12, 5,13, 5,14, 5,16, 5,18, 5,36, 6,4, 6,9, 6,10, 6,12, 6,13, 6,14, 6,16, 6,18, 6,36, 10,4, 10,9, 10,10, 10,12, 10,13, 10,14, 10,16, 10,18, 10,36, 10,T, 12,4, 12,9, 12,10, 12,12, 12,13, 12,14, 12,16, 12,18, 12,36, 12,T and blends or copolymers thereof.

Alternatively, the polyamide blocks, may be made from the following polyamides (copolyamides): PA 6/12 where 6 denotes caprolactam and 12 denotes lauryllactam; PA 11/12 where 11 denotes 11-aminoundecanoic acid and 12 denotes lauryllactam; PA 6/11 where 6 denotes caprolactam and 11 denotes 11-aminoundecanoic acid; PA 6/6.6 where 6 denotes caprolactam and 6.6 denotes a monomer resulting from the condensation of hexamethylenediamine with adipic acid. Examples, include PA 10.10/11, PA 6.10/11, PA 10.12/11, PA 10.10/11/12, PA 6.10/10.10/11, PA 6.10/6.12/11, PA 6.10/6.12/10.10, PA 11/6.36, PA 11/10.36 and PA 10.10/10.36.

As examples of polyamide blocks, mention may be made of those comprising at least one of the following molecules: PA-12, PA-11, PA-10,10, PA-6,10, PA-6, PA-6/12, a copolyamide comprising at least one of the following monomers: 11, 5,4, 5,9, 5,10, 5,12, 5,13, 5,14, 5,16, 5,18, 5,36, 6,4, 6,9, 6,10, 6,12, 6,13, 6,14, 6,16, 6,18, 6,36, 10,4, 10,9, 10,10, 10,12, 10,13, 10,14, 10,16, 10,18, 10,36, 10,T, 12,4, 12,9, 12,10, 12,12, 12,13, 12,14, 12,16, 12,18, 12,36, 12,T and blends or copolymers thereof.

Polyamide block copolymer (A1) also comprises soft or flexible blocks that can be envisaged in the copolymer according to the invention, are understood in particular to be those chosen from polyether blocks and polyester blocks. By way of example, the polyether blocks are chosen from poly(ethylene glycol) (PEG), poly(1,2-propylene glycol) (PPG), poly(1,3-propylene glycol) (PO3G), poly(tetramethylene glycol) (PTMG) and copolymers or blends thereof. Preferably, the number-average molecular weight Mn of the soft blocks according to the invention is within the range extending from 250 to 5000 g/mol, alternatively from 250 to 3000 g/mol, alternatively from 500 to 2000 g/mol based on polystyrene equivalents using the method described in ASTM D6474-12.

According to one preferred embodiment, the PA blocks of the copolymer used in the invention comprise more than 70 mol %, preferably more than 80 mol %, preferably more than 90 mol %, preferably 100 mol % of an equimolar combination of at least one cycloaliphatic diamine and of at least one aliphatic, preferably linear, dicarboxylic acid having from 12 to 18 carbon atoms.

Preferably, said at least one copolymer comprises a copolymer having polyamide blocks and polyether blocks (PEBA). Advantageously, said PEBA comprises PA-12/PEG, PA-6/PEG, PA-6/12/PEG, PA-11/PEG, PA-12/PEG, PA-12/PTMG, PA-6/PTMG, PA-6/12/PTMG, PA-11/PTMG, PA-12/PEG/PPG, PA-6/PEG/PPG, PA-6/12/PEG/PPG, PA-11/PEG/PPG, PA-11/PO3G, PA-6,10/PO3G and/or PA-10,10/PO3G.

PEBA copolymers are commercially available such as those sold under the PEBAX® Trade mark by Arkema or those sold under the Vestamid® trade mark by Evonik.

Thermoplastic Organic Polymer (A2)

Thermoplastic organic polymer (A2) used herein may be selected from a wide variety of alternatives; including for the sake of example polyamide resins, long chain synthetic polymers containing amide (i.e., —C(O)—NH—) linkages along the main polymer chain, polyester resin, thermoplastic resins such as Polycarbonates (PC), Acrylonitrile-Butadiene-Styrene terpolymers (ABS), polystyrene, poly(phenylene oxide) (PPO), polypropylene (PP), thermoplastic polyolefins (TPO), polyetherimide (PEI), polyketones and compatible mixtures thereof.

Furthermore, (A2) may also be a block copolymer, thermoplastic elastomer polymers, such as Polyurethane, Copolyester, Polyolefin Copolymers, Styrene polyolefin block polymer copolymer such as SBS, SEBS, SEPS, SEEPS, SIBS but as previously indicated (A2) cannot be the same as (A1).

(A2) may contain a compatible mixture of any two or more of the above.

Silicone Composition B

Silicone Base (B1)

Diorganopolysiloxane Polymer (B1a)

The diorganopolysiloxane polymer (B1a) may have a predominantly linear molecular structure. The diorganopolysiloxane polymer (B1a) can for example comprise an α,ω-vinyldimethylsiloxy polydimethylsiloxane, an α,ω-vinyldimethylsiloxy copolymer of methylvinylsiloxane and dimethylsiloxane units, and/or an α,ω-trimethylsilyloxy copolymer of methylvinylsiloxane and dimethylsiloxane units. The diorganopolysiloxane polymer (B1a) has a viscosity of at least 1000000 mPa·s at 25° C. measured may be measured by using an AR 2000 Rheometer from TA Instruments of New Castle, Del., USA or a suitable Brookfield viscometer with the most appropriate spindle for the viscosity being measured. The diorganopolysiloxane polymer (B1a) can if desired be a gum characterised by Williams plasticity value as measured by ASTM D-926-08 using a Williams Parallel plate plastimeter given the viscosity values are so high they become very difficult to determine with accuracy. The diorganopolysiloxane polymer (B1a) can if desired be modified with a small amount of an unreactive silicone such as a trimethylsilyl-terminated polydimethylsiloxane. In one alternative the diorganopolysiloxane polymer (B1a) is a gum.

The alkenyl groups of the diorganopolysiloxane (B1a) can be exemplified by vinyl, hexenyl, allyl, butenyl, pentenyl, and heptenyl groups. Silicon-bonded organic groups in diorganopolysiloxane polymer (B1a) other than alkenyl groups may be exemplified by methyl, ethyl, propyl, butyl, pentyl, hexyl, or similar alkyl groups; or phenyl, tolyl, xylyl, or similar aryl groups.

Reinforcing Filler (B1b)

The reinforcing filler (B1b) can for example be silica. The silica can for example be fumed (pyrogenic) silica, such as that sold by Cabot under the trade mark Cab-O-Sil MS-75D, or can be precipitated silica. The particle size of the silica is for example in the range 0.5 µm to 20 µm, alternatively 1 µm to 10 µm. The silica can be treated silica produced for example by treating silica with a silane or with a polysiloxane. The silane or polysiloxane used to treat the silica usually contains hydrophilic groups which bond to the silica surface and aliphatically unsaturated hydrocarbon or hydrocarbonoxy groups and/or Si-bonded hydrogen atoms.

The silica can for example be treated with an alkoxysilane, for example a silane comprising at least one Si-bonded alkoxy group and at least one Si-bonded alkenyl group or at least one Si-bonded hydrogen atom. The alkoxysilane can be a monoalkoxysilane, a dialkoxysilane or a trialkoxysilane containing at least one aliphatically unsaturated hydrocarbon group such as a vinylalkoxysilane, for example vinyltrimethoxysilane, vinyltriethoxysilane or vinylmethyldimethoxysilane. The Si-bonded alkoxy groups are readily hydrolysable to silanol groups which bond to the silica surface.

The silica can alternatively be treated with a polysiloxane, for example an oligomeric organopolysiloxane, containing Si-bonded alkenyl groups and silanol end groups.

The silica can for example be treated with 2% to 60% by weight based on the silica of an alkoxysilane containing alkenyl groups or an oligomeric organopolysiloxane containing alkenyl groups.

Organohydrido Silicone Compound (B2)

Organohydrido silicone compound (B2) having at least two Si-bonded hydrogen atoms per molecule can for example be a low molecular weight organosilicon resin or a short or long chain organosiloxane polymer, which may be linear or cyclic. The Organohydrido silicone compound (B2) preferably has at least 3 silicon-bonded hydrogens per molecule which are capable of reacting with the alkenyl or other aliphatically unsaturated groups of the diorganopolysiloxane polymer (B1a). The Organohydrido silicone compound (B2) may for example have the general formula $$R^3R^4_2SiO(R^4_2SiO)_p(R^4HSiO)_qSiR^4_2R^3 \quad \text{or}$$

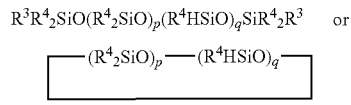

wherein $R^4$ denotes an alkyl or aryl group having up to 10 carbon atoms, and $R^3$ denotes a group $R^4$ or a hydrogen atom, p has a value of from 0 to 20, and q has a value of from 1 to 70, and there are at least 2 or 3 silicon-bonded hydrogen atoms present per molecule. R4 can for example be a lower alkyl group having 1 to 3 carbon atoms, such as a methyl group. The Organohydrido silicone compound (B2) can for example have a viscosity of from 1 to 150 mPa·s at 25° C., alternatively 2 to 100 mPa·s or 5 to 60 mPa·s at 25° C. The average degree of polymerisation of the organopolysiloxane (B2) can for example be in the range 30 to 400 siloxane units per molecule. Examples of suitable Organohydrido silicone compound (B2) include trimethylsiloxane end-blocked polymethylhydrosiloxanes, dimethylhydrosiloxane end-blocked methylhydro siloxane, dimethylsiloxane methylhydrosiloxane copolymers and tetramethylcyclotetrasiloxane. The Organohydrido silicone compound (B2) may comprise a mixture of more than one of these materials.

The molar ratio of Si—H groups in the Organohydrido silicone compound (B2) to aliphatically unsaturated groups in the diorganopolysiloxane polymer (B1a) is preferably at least 1:1 and can be up to 8:1 or 10:1. For example the molar ratio of Si—H groups to aliphatically unsaturated groups is in the range from 1.5:1 to 5:1.

Hydrosilylation catalyst (C) The hydrosilylation catalyst (C) is preferably a platinum group metal (Group VIII of the Periodic Table) or a compound thereof. Platinum and/or platinum compounds are preferred, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

The catalyst (C) is preferably used in an amount of 0.5 to 100 parts per million by weight platinum group metal based on the polyorganosiloxane composition (B), more preferably 1 to 50 parts per million. The hydrosilylation catalyst (C) catalyses the reaction of the alkenyl groups of diorganopolysiloxane polymer (B1a) with the Si—H groups of Organohydrido silicone compound (B2).

Additives—Component D

Components (D) are present in the thermoplastic elastomer compositions of the invention to obtain a desired processing or performance property for the thermoplastic elastomer.

Such additional components may for example include softening mineral oils, plasticisers, other mineral fillers (i.e. excluding the (B1b) reinforcing fillers, viscosity modifiers, stabilisers, lubricants, polydimethylsiloxane (PDMS), thermoplastic elastomer and fire resistant additives, colouring agents such as pigments and/or dyes; effect pigments, such as diffractive pigments; interference pigments, such as pearlescent agents; reflective pigments and mixtures thereof and mixtures of any of the above pigments; UV stabilizers, anti-aging agents, antioxidants, fluidizing agents, anti-abrasion agents, mold-release agents, stabilizers, plasticizers, impact modifiers, surfactants, brighteners, fillers, fibres, waxes, and mixtures thereof, and/or any other additive well known in the field of polymers.

Such component should be used alone or in combination. Addition level of component (D) should be up to 30 weight % of total composition. Preferably if there is one or more components (D) present the total cumulative amount of said additives is typically present from 0.01 to 20%, preferably from 0.01 to 10%, preferably from 0.01 to 5%, by weight out of the total weight of the composition Mineral oils are generally petroleum distillates in the C15 to C40 range, for example white oil, liquid paraffin or a naphthenic oil. If used, the mineral oil can for example be premixed with the thermoplastic organic polymer (A). The mineral oil can for example be present at 0.5 to 20% by weight based on the thermoplastic organic polymer (A).

Plasticizers can be present in combination with or alternatively to mineral oils. Examples of suitable plasticisers include phosphate ester plasticisers such as friaryl phosphate isopropylated, resorcinal bis-(diphenyl phosphate) or phosphate ester sold by Great Lakes Chemical Corporation under the trade mark Reofos® RDP. Such plasticizers can for example be used in a range from 0.5 up to 15%.

Examples of other mineral fillers include talc or calcium carbonate. Fillers may be treated to make their surface hydrophobic. Such fillers, if present, are preferably present at a lower level than the reinforcing filler (B1b) such as silica. Said fillers may be premixed either with the thermoplastic organic polymer (A) or the silicone base (B1).

Examples of pigments include carbon black and titanium dioxide. Pigments can for example be premixed with the thermoplastic organic polymer (A).

A stabiliser can for example be an antioxidant, for example a hindered phenol antioxidant such as tetrakis (methylene(3,5-di-tert-butyl-4-hydroxy-hydrocinnamate) methane sold by BASF under the trade mark 'Irganox 1010'. Such an antioxidant can for example be used at 0.05 to 0.5% by weight of the thermoplastic elastomer composition.

A lubricant can for example be a surface lubricating additive to improve the processability of the thermoplastic elastomer in moulding operations. An example of a surface lubricating additive is Ethylbutylstearamide sold by CRODA under the trade mark 'Crodamide-EBS'. A lubricant can for example be used at 0.1 to 2% by weight of the thermoplastic elastomer composition.

Also contemplated within the scope of this invention is the use of fire retardant additives to provide fire retardancy to the compositions of this invention. Traditional fire retardants can be used herein and can be selected from the group consisting of halogenated varieties such as polydibromostyrene, copolymers of dibromostyrene, polybromostyrene, brominated polystyrene, tetrabromophthalate esters, tetrabromophthalate diol, tetrabromophthalate anhydride, tetrabromobenzoate ester, hexabromocyclododecane, tetrabromobisphenol A, tetrabromobisphenol A bis(2,3-dibromopropyl ether), tetrabromobisphenol A bis(allyl ether), phenoxy-terminated carbonate oligomer of tetrabromobisphenol A, decabromodiphenylethane, decabromodiphenyl oxide, bis-(tribromophenoxyl)ethane, ethane-1,2-bis (pentabromophenyl), tetradecabromodiphenoxybenzene, ethylenebistetrabromophthalimide, ammonium bromide, poly pentabromobenzyl acrylate, brominated epoxy polymer, brominated epoxy oligomer, and brominated epoxies. Other, non-halogen varieties can be selected from such materials as friaryl phosphates isopropylated, cresyl diphenyl phosphate, tricresyl phosphate, trixylxl phosphate, triphenylphosphate, triaryl phosphates butylated, resorcinol bis-(diphenyl phosphate), bisphenol A bis(diphenyl phosphate), melamine phosphate, melamine pyrophosphate, melamine polyphosphate, dimelamine phosphate, melamine, melamine cyanurate, magnesium hydroxide, antimony trioxide, red phosphorous, zinc borate, and zinc stanate. It is known by those skilled in the art with regard to how much of the fire retardant can be added to give the required effect. Those amounts are also useful herein.

As hereinbefore described there is also provided herein a process for forming a vulcanised thermoplastic elastomer from the thermoplastic elastomer composition described above. By contacting thermoplastic materials (A) with silicone composition (B).

The weight ratio of (A) to (B) is in the range 50:50 to 95:5.

Additional component (D) could be added in composition to further manage invention properties according specifics needs of end application.

The thermoplastic elastomer is produced by contacting the thermoplastic organic polymer (A), which may be premixed with additives (D) (when present) i.e. =(A)+(D, if present) with silicone composition B comprising (B1) a silicone base comprising:

(B1a) a diorganopolysiloxane polymer (preferably a gum) having an average of at least 2 alkenyl groups per molecule, (B1b) from 1 to 50% by weight based on the diorganopolysiloxane polymer (B1a) of a reinforcing filler, and (B2) an organohydrido silicone compound which contains an average of at least 2 silicon-bonded hydrogen groups per molecule, (C) a hydrosilylation catalyst.

The above ingredients are generally contacted at elevated temperature, for example a temperature in the range 100° C. to 250° C. A temperature in the range 160° C. to 240° C., alternatively 180° C. to 220° C., can conveniently be used. Reaction of the alkenyl groups of diorganopolysiloxane polymer (B1a) with the Si—H groups of organohydrido silicone compound (B2) proceeds simultaneously with mixing of the silicone composition (B) with the pre-mixture of (A)+(D, if present), resulting in the production of a vulcanised thermoplastic elastomer composition.

The ingredients are mixed in any device capable of dispersing the silicone components uniformly in the thermoplastic organic polymer (A). The pre-mixture of (A)+(D, if present), and the silicone composition (B) can for example be blended in an extruder. The extruder can be a uniaxial extruder, a biaxial extruder, or a multiaxial extruder. A twin screw extruder, particularly one having a length/diameter (L/D) ratio over 40, is generally suitable. The screw speed can for example be 150 to 300 rpm The residence time of the pre-mixture of (A)+(D, if present) and silicone base (B1) in an extruder can for example be 30 to 240 seconds.

The silicone base can be prepared by premixing the diorganopolysiloxane polymer (preferably a gum) (B1a) and the reinforcing filler (B1b) before feeding the silicone base (B1) to the extruder or other mixing device, or the diorganopolysiloxane polymer gum (B1a) and the reinforcing filler (B1b) can be fed separately to the mixing device. The silicone base (B1) can be mixed with the pre-mixture of (A)+(D, if present) in the initial processing section of the extruder. The pre-mixture of (A)+(D, if present) can for example be introduced into the main feed of a co-rotative twin screw extruder operating at a temperature high enough to melt the thermoplastic organic polymer. The silicone base (B1) can be added into the already melted olefin polymer phase using for example a gear pump. To maintain the quality of working surroundings and avoid side reactions, inert gas flushing or deaeration using a single stage venting or multi-stage venting can be used.

The organohydrido silicone compound (B2) and the hydrosilylation catalyst (C) can be added in subsequent sections of the extruder. Dynamical cure or vulcanizing of diorganopolysilxane is conducted during the mixing stage, typically within the extruder, when both the organohydrido silicone compound (B2) and the hydrosilylation catalyst (C) have been added to the composition. The order of addition of the organohydrido silicone compound (B2) and the hydrosilylation catalyst (C) is not critical. However whichever of these components is added first should be well dispersed in the mixture before the other component is added to initiate dynamic vulcanization. For example the organohydrido silicone compound (B2) can be added to the composition after the pre-mixture of (A)+(D, if present) and the silicone base (B1) have been mixed, and the hydrosilylation catalyst (C) can be added subsequently to initiate dynamic vulcanization while continuing mixing. The organohydrido silicone compound (B2) could alternatively be added to the composition with the silicone base (B1). In a further alternative, the hydrosilylation catalyst (C) can be added to the composition after the pre-mixture of (A)+(D, if present) and the silicone base (B1) have been mixed, and the organohydrido silicone compound (B2) can be added subsequently to initiate dynamic vulcanization while continuing mixing.

Alternative plastic mixing equipment can be used, for example a batch internal mixer such as a Z-blades mixer or a Banbury mixer. The components can be mixed in the order described above, allowing sufficient mixing time for the silicone base (B1) and organohydrido silicone compound (B2) to be well dispersed in thermoplastic polyurethane polymer before the hydrosilylation catalyst is added to initiate dynamic vulcanization.

The weight ratio (A):(B) of 2 components is always a respective amount of (A) and (B) with a total amount of (A)+(B) of 100.

The weight ratio of the pre-mixture of (A)+(D), if (D) is present to the silicone composition (B) is generally in the range 50:50 to 95:5. Within this range, the level of silica in the silicone composition (B), the weight ratio of the pre-mixture of (A)+(D), if (D) is present to the silicone composition (B) and the cross-linking density of the silicone can be varied to give the desired balance of soft touch feel, mechanical performance, moisture resistance, chemical resistance against cosmetics and scratch resistance. The cross-linking density of the silicone can be varied by varying the diorganopolysiloxane polymer (B1a) used, in particular with respect to the siloxane chain length between alkenyl groups. A long chain diorganopolysiloxane polymer gum (B1a) having only two terminal alkenyl groups will form a softer thermoplastic elastomer; a diorganopolysiloxane polymer (B1a) which may be a gum having more alkenyl groups or a shorter chain length will form a harder thermoplastic elastomer.

Use

Elastomers resulting from the cure of the above thermoplastic elastomer compositions combine high mechanical performance, scratch resistance and improved durability with a desirable soft touch and may be used in a wide spectrum of applications such as for example:

The thermoplastic elastomers can for example be used for fabricating parts or components for automotive applications such as gear knobs, seat belt connectors, interior mats, airbag protective covers, over-moulded skins for dash boards and armrests; functional automotive parts such as ducts such as air ducts, cable insulation, oil hoses and tanks airbag cover skin, steering wheel skin, gear knobs, grip handle, arm rest, interior skin, car mats (such as cup holder, bin, glove box mat), small knobs, switches, and large automotive parts (large meaning of surface greater than 20 $cm^2$) such as glove box panel, dashboard and door panels.

The thermoplastic elastomers can also be used for fabricating parts or components for electronics and appliance applications such as belts, bracelets, soft temple tips, protective covers and wearable electronics; hoses, boots, bellows, gaskets, soft-feel covers, keyboards palm rest, parts and protective covers of laptops and tablet computing devices.

The thermoplastic elastomers can also be used for fabricating parts or components in sporting goods applications elements of soles of footwear for sprinting, football, rugby, tennis, basket-ball, running, Alpine or Nordic skiing, as well as in golf balls, and in many other sports articles;

The thermoplastic elastomers can also be used for fabricating parts or components for electronic device parts in portable electronic, electrical, communication, appliances;

The thermoplastic elastomers can also be used for fabricating parts or components in medical device applications notably as catheters, angioplasty balloons, peristaltic bands;

The thermoplastic elastomers can also be used for fabricating wearable items or parts or components thereof, such as watch bracelets, GPS bracelets, temple tips and nose pads for sun and reading glasses Such wearable items retain their attributes over prolonged contact with human skin and various cosmetic chemicals on the skin such as fragrances, moisturizers and creams, and skin exudates such as sweat.

The thermoplastic elastomers can also be used in general rubber applications requiring durable aesthetics, haptic and ergonomic properties along with stability and low staining when exposed to most commonly used chemicals, as well as high mechanical performances, abrasion and scratch resistance. conveyor belts, as breathable rainwear. Due to its intrinsic elastomeric properties, it can also be used for weather insulation, such as mirror seal, interior and exterior seal. Due to the combination of scratch resistance, durability performance and elastomeric properties, it can be used for shoes applications.

The thermoplastic elastomers can also be used for fabricating other applications such as protective covers; liquid line components and air ducts (non-automotive); architectural seals; bottle closures; furniture components; resistant and soft-feel grips for hand held devices; packaging components such as seals, bottles, cans, cups; medical and hygiene devices; cookware parts and accessories;

The thermoplastic elastomer may be extruded, co-extruded, extruded-laminate, calendaring, extruded-calendaring or laminate to form a thermoplastic film, thermoplastic sheet and synthetic leather, with grain or none grain surfaces. For example it can be applied on textile creating a laminate forming a synthetic leather product. Co-extrusion or post processing with a compatible material, thermoplastic, synthetic woven or non-woven textile can be achieved to form a complex laminate. Co-extrusion or post processing with a non compatible material thermoplastic, synthetic or natural woven or non-woven textile, to form a complex laminate can be achieved using adequate primer or interfacial material.

Examples of such applications are:

Synthetic leather for automotive application uses such as seat, door panel cover, gear knob, arm rests, steering wheels, wheels cover;

Synthetic leather for appliance on electronic application such as electronic devices such as laptops or tablets providing soft touch feeling;

Synthetic leather for sporting goods and footwear applications watch bands or straps for fitness tracking devices;

2 K or two-shot injection moulded parts based on overmoulded, coextruded, or back sheet moulded part with the thermoplastic elastomer composition of this invention and compatible material;

2 K or two-shot injection moulded parts based on overmoulded, coextruded, or back sheet moulded part with the thermoplastic elastomer composition of this invention and non-compatible material plus use of adequate adhesion promoter or technique to bond these.

The weight ratio (A):(B) of 2 components is always a respective amount of (A) and (B) with a total amount of (A)+(B) of 100.

The weight ratio of the thermoplastic organic polyether block amide copolymer to the silicone composition (B) is generally in the range 50:50 to 95:5. Within this range, the level of silica in the silicone composition (B), the weight ratio of the thermoplastic organic polyether block amide copolymer to the silicone composition (B) and the cross-linking density of the silicone can be varied to give the desired balance of soft touch feel, mechanical performance, moisture resistance, chemical resistance against cosmetics and scratch resistance. The cross-linking density of the silicone can be varied by varying the diorganopolysiloxane polymer (B1a) e.g. a gum used, in particular with respect to the siloxane chain length between alkenyl groups. A long chain diorganopolysiloxane gum (B1a) having only two terminal alkenyl groups will form a softer thermoplastic elastomer; a diorganopolysiloxane gum (B1a) having more alkenyl groups or a shorter chain length will form a harder thermoplastic elastomer.

Due to the combination of scratch resistance, durability performance and elastomeric properties, such materials may be used for footwear applications.

EXAMPLES

The invention is illustrated by the following examples, in which parts and percentages are by weight unless otherwise stated.

The materials used in the Examples were:

Si-Rubber 1: Uncatalysed Silicone Rubber Base, comprising a vinyl-terminated diorganopolysilxane gum and silica. The base has a plasticity value of 360 mm/100 measured using a Williams Parallel plate plastimeter in accordance with ASTM D-926-08. Si-Rubber 1 is intended to have a Shore A hardness of 70 upon cure.

Si-Rubber 2: Uncatalysed Silicone Rubber base, comprising a vinyl-terminated diorganopolysilxane gum and silica. The base has a plasticity value of 169 mm/100 measured using a Williams Parallel plate plastimeter in accordance with ASTM D-926-08. Si-Rubber 2 is intended to have a shore A hardness of 40 upon cure.

A Silicone based catalyst solution containing adequate catalyst concentration able to cure Si Rubber bases above PEBA 3: thermoplastic organic polyether block amide copolymer of 25 shore D PEBA 1 thermoplastic organic polyether block amide copolymer of 41 shore D TPU 1: Aliphatic TPU Desmopan 85085 DP0063

TPU 2: Aromatic TPU Pearlthane 11T85

Thermoplastic elastomers were prepared by mixing of components and vulcanisation was carried out using a twin screw extruder. The processing section was heated in a range from 160° C. up to 240° C. the screw speed was between 150 and 400 rpm. Si-Rubber 1 or 2 was added to an organic thermoplastic pre-blend within the first sections of the extruder, then the organohydridopolysiloxane cross linker and the catalyst, which initiates the vulcanization of the silicone composition within the thermoplastic matrix were added. The proportions of materials are depicted in Table 1 and 3.

Gloss Measurement

Gloss is determined by projecting a beam of light at a fixed intensity and angle onto a surface and measuring the amount of reflected light at an equal but opposite angle.

TABLE 1

|  | PEBA 1 | Ex 1 | Ex. 2 | Ex. 3 | Ex. 4 |
| --- | --- | --- | --- | --- | --- |
| Si-Rubber 1 with adequate curing agent solution and concentration to ensure crosslinking | 0 | 20.87 |  | 52.8 |  |
| Si Rubber 2 with adequate curing agent solution and concentration to ensure crosslinking | 0 |  | 21.19 |  | 52.98 |
| PEBA 1 | 100 | 79.13 | 78.81 | 47.82 | 47.02 |

Test specimens for mechanical and scratch resistance testing were prepared by injection moulding. Heating temperature for injection moulding was set at 180° C. to 220° C. and mold temperature set at 40° C. The mechanical properties were tested according to international standards as set out in Table 2 below.

TABLE 2

|  | Unit | Standard | PEBA 1 | Ex 1 | Ex. 2 | Ex. 3 | Ex. 4 |
|---|---|---|---|---|---|---|---|
| Hardness | ShoreA | ISO 868 | 93.4 | 91.8 | 90.9 | 87.2 | 85.5 |
| Tensile strength at 100% of elongation - transversal- 500 mm/min | MPa | ISO 37 | 8.5 | 8.6 | 8.2 | 7.6 | 8.5 |
| Tensile strength at 200% of elongation - transversal- 500 mm/min | MPa | ISO 37 | 8.6 | 9.8 | 9.7 | 9.4 | 10.6 |
| Tensile strength at 300% of elongation - transversal- 500 mm/min | MPa | ISO 37 | 9.3 | 11.7 | 11.5 | 11.1 | 12.4 |
| Tensile strength at break - transversal- 500 mm/min | MPa | ISO 37 | 43.8 | 19.5 | 20.8 | 15.9 | 15 |
| Elongation at break - transversal- 500 mm/min | % | ISO 37 | 905 | 528 | 579 | 544 | 455 |
| Tear strength - Transversal- 500 mm/min | N/mm | ISO R 34/B/A | 128 | 112.2 | 98.3 | 71.8 | 69.1 |
| Flexural modulus | MPa |  | 85 | 76 | 63 | 46 | 37 |
| Gloss B |  | Internal | 34 | 39 | 30 | 13 | 9 |

Comparative example (table 2) shows the benefits of present invention in hardness lowering (compared to pure PEBA 1) and moreover flexibility increase.
It can be observe that elastomeric performance in present invention are maintain, with ultimate elongation value over 400%.

It can be observed that present invention is able to manage different properties such as flexibility, hardness, elastic properties and gloss by using various silicone Si Rubber composition with adequate curing agent solution and concentration to ensure crosslinking, and keep using a similar PEBA.

TABLE 3

|  | PEBA 3 | TPU 1 | TPU 2 | Ex 1 | Ex. 2 | Ex. 3 | Ex. 4 |
|---|---|---|---|---|---|---|---|
| Si-Rubber 1 with adequate curing agent solution and concentration to ensure crosslinking | 0 |  |  |  | 26.09 |  | 26.09 |
| Si Rubber 2 with adequate curing agent solution and concentration to ensure crosslinking | 0 |  |  | 26.49 |  | 26.49 |  |
| PEBA 3 | 100 |  |  | 47.02 | 47.82 | 47.02 | 47.82 |
| TPU 1 |  | 100 |  | 26.49 | 26.09 |  |  |
| TPU 2 |  |  | 100 |  |  | 26.49 | 26.09 |

Test specimens for mechanical and scratch resistance testing were prepared by injection moulding. Heating temperature for injection moulding was set at 180° C. to 220° C. and mold temperature set at 40° C. The mechanical properties were tested according to international standards as set out in Table 4 below.

TABLE 4

|  | Unit | Standard | PEBA 3 | TPU 1 | TPU 2 | Ex 1 | Ex 2 | Ex 3 | Ex 4 |
|---|---|---|---|---|---|---|---|---|---|
| Hardness | Shore A | ISO 868: 2003(en) | 80 | 85.1 | 85.8 | 78.7 | 79.4 | 76.2 | 78.7 |
| Tensile strength at 100% of elongation - transversal- 500 mm/min | MPa | ISO 37: 2011(en) | 4.1 | 4.1 | 5.9 | 5.1 | 5.4 | 4.5 | 4.6 |
| Tensile strength at 200% of elongation - transversal- 500 mm/min | MPa | ISO 37: 2011(en) | 4.3 | 5 | 7.5 | 7.0 | 7.1 | 6.1 | 5.9 |
| Tensile strength at 300% of elongation - transversal- 500 mm/min | MPa | ISO 37: 2011(en) | 4.9 | 6.1 | 10.4 | 8.9 | 8.9 | 7.9 | 7.7 |
| Tensile strength at break - transversal- 500 mm/min | MPa | ISO 37: 2011(en) | 22.6 | 22.1 | 42.3 | 13 | 13.7 | 15.7 | 17.6 |
| Elongation at break - transversal- 500 mm/min | % | ISO 37: 2011(en) | 928 | 887 | 573 | 529.1 | 555.9 | 544.7 | 557.5 |
| Tear strength - Transversal- 500 mm/min | N/mm | ISO R 34/B/A | 87.7 | 109.9 | 106.5 | 73.5 | 76.9 | 63.3 | 65.8 |
| Abrasion resistance, weight loss, | Mm3 |  | na | 65 | 46 | 26 | 30 | 27 | 30 |
| Gloss B | na | Internal | 57 | 65 | 70 | 1.4 | 1.4 | 1.4 | 1.6 |

Comparative example (table 4), a silicone free elastomer shows a hardness of 80 shore A (PEBA 3), as silicone based elastomer of present invention.

Comparative example in table 4 shows that different composition of present invention helps to increase mechanical performance at 100%, 200% and 300% elongation measured at room temperature comparing to PEBA 3, while maintaining a similar hardness.

Ultimate performance of products based on present invention confirms the elastomeric properties, with ultimate elongation value over 400%.

Another benefits of present invention is the important reduction of surface gloss: addition of a silicone phase in the material brings an intrinsic mat effect while pure CoPA is glossy

The invention claimed is:

1. A thermoplastic elastomer composition comprising a blend of
  (A) thermoplastic materials comprising
    (A1) a polyamide block copolymer, said polyamide block copolymer comprising hard blocks derived from polyamides and soft blocks derived from polyesters, polyethers, or copolymers of polyesters and polyethers; and
    (A2) one or more thermoplastic organic polymers that are different from (A1), said thermoplastic organic polymers selected from the group consisting of copolymers with polyurethane blocks and polyether blocks, and copolymers with polyester blocks and polyether blocks; with
  (B) a silicone composition comprising:
    (B1) a silicone base comprising (B1a) a diorganopolysiloxane polymer having a viscosity of at least 1,000,000 mPa·s at 25° C. and an average of at least 2 alkenyl groups per molecule, selected from an α, ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units, and (B1b) a reinforcing filler in an amount of from 1 to 50% by weight of polymer (B1a), and (B2) an organohydrido silicone compound which contains an average of at least 2 silicon-bonded hydrogen groups per molecule; and
  (C) a hydrosilylation catalyst;
which composition may additionally optionally comprise:
  (D) one or more additives selected from the group consisting of softening mineral oils, plasticizers, mineral fillers that are different from the (B1b) reinforcing filler, viscosity modifiers, stabilizers including UV stabilizers, lubricants, unreactive polydimethylsiloxanes, fire resistant additives, coloring agents, effect pigments, interference pigments, reflective pigments, anti-aging agents, antioxidants, fluidizing agents, anti-abrasion agents, mold-release agents, surfactants, brighteners, fibers, and waxes;
wherein the weight ratio (A) : (B) is in the range 50:50 to 95:5, and wherein component B2 and C are present in an amount sufficient to cure said silicone composition B.

2. The thermoplastic elastomer composition according to claim 1 wherein the diorganopolysiloxane polymer (B1a) is a diorganopolysiloxane gum.

3. The thermoplastic elastomer composition according to claim 1 wherein the reinforcing filler (B1b) is silica.

4. The thermoplastic elastomer composition according to claim 3 wherein the silica reinforcing filler (B1b) is present at from 2 to 20% by weight based on the weight of the diorganopolysiloxane polymer (B1a).

5. The thermoplastic elastomer composition according to claim 4 wherein the silica reinforcing filler (B1b) is present at from 6 to 20% by weight.

6. A vulcanized thermoplastic elastomer that is the product of curing the thermoplastic elastomer composition in accordance with claim 1.

7. A part or component for sports equipment, footwear, automotive, appliances, electronics, portable electronic, electrical, communication, and medical applications wherein the part or component comprises the thermoplastic elastomer in accordance with claim 6.

8. A wearable item comprising the thermoplastic elastomer in accordance with claim 6.

9. A process for forming the vulcanized thermoplastic elastomer in accordance with claim 6 comprising mixing (A) the thermoplastic materials, (B) the silicone composition, (C) the hydrosilylation catalyst, and optionally the one or more additives (D).

10. The process according to claim 9 wherein the thermoplastic materials (A), the silicone base (B1), the organohydrido silicone compound (B2) and the hydrosilylation catalyst (C) are contacted at a temperature in the range 100° C. to 250° C.

11. The process according to claim 9 wherein the thermoplastic materials (A), the silicone base (B1), the organohydrido silicone compound (B2) and the hydrosilylation catalyst (C) are blended in an extruder.

12. The process in accordance with claim 9 wherein after forming said thermoplastic elastomer is extruded, co-extruded, laminated, calendered and/or extruded-calendering to form a thermoplastic film or thermoplastic sheet.

13. A method of making a wearable item comprising curing the thermoplastic elastomer composition of claim 1 to form the wearable item, wherein the wearable item is intended to be in contact with the wearer's skin when in use.

14. A method of making a part or component for sports equipment, footwear, automotive, appliances, electronics, portable electronic, electrical, communication, or medical applications, comprising: curing the thermoplastic elastomer composition in accordance with claim 1.

* * * * *